United States Patent [19]

Shaheen et al.

[11] Patent Number: 5,434,994

[45] Date of Patent: Jul. 18, 1995

[54] SYSTEM AND METHOD FOR MAINTAINING REPLICATED DATA COHERENCY IN A DATA PROCESSING SYSTEM

[75] Inventors: Amal A. Shaheen; Krishna K. Yellepeddy, both of Austin, Tex.

[73] Assignee: International Business Machines Corporation, Armonk, N.Y.

[21] Appl. No.: 247,422

[22] Filed: May 23, 1994

[51] Int. Cl.6 .................................................. G06F 7/20
[52] U.S. Cl. ..................................... 395/500; 395/200; 395/600
[58] Field of Search .................. 395/200, 500, 600

[56] References Cited

U.S. PATENT DOCUMENTS

| | | | |
|---|---|---|---|
| 4,432,057 | 2/1984 | Daniell et al. | 395/725 |
| 4,562,539 | 12/1985 | Vince | 395/200 |
| 5,261,094 | 11/1993 | Everson et al. | 395/600 |
| 5,274,789 | 12/1993 | Costa et al. | 395/425 |
| 5,333,265 | 7/1994 | Orimo et al. | 395/200 |

OTHER PUBLICATIONS

Chu et al, "Tutorial-Centralized and Distributed Data Base Systems", IEEE Computer Society, P.531-544, Oct. 1-4, 1979.

*Primary Examiner*—Parshuiam S. Lall
*Assistant Examiner*—Paulina Lintsai
*Attorney, Agent, or Firm*—Mark S. Walker

[57] ABSTRACT

A system and method for maintaining data coherency in a system in which data is replicated on two or more servers. Each server is able to update the data replica present on the server. Updates are logged for each server. Reconciliation of server data replicas is aggressively initiated upon the occurrence of predefined events. These events include arrival at a scheduled time, a request for data by a client system, server and network failure recovery. Reconciliation is managed by a coordinator server selected to ensure that at most one coordinator server per network partition is selected. Logged updates are merged and transmitted to each server containing a data replica. The logged updates are applied unless a conflict is detected. Conflicts are collected and distributed for resolution. Reconciliation is managed between servers without regard to operating system or physical file system type.

11 Claims, 4 Drawing Sheets

SYSTEM AND METHOD FOR MAINTAINING REPLICATED DATA COHERENCY IN A DATA PROCESSING SYSTEM

BACKGROUND OF THE INVENTION

1. Field of the Invention

The present invention relates to data management and, more particularly, to the management of replicated data in a single cluster or distributed processing system. Still more particularly, the present invention relates to a system and procedure for maintaining data coherency in data replicas in either a cluster or distributed configuration.

2. Background and Related Art

Computer systems can consist of one or more computers. Distributed computer systems are created by linking a number of computer systems by a private communication mechanism, local area network (LAN) or wide area network (WAN). Each of the linked computers typically has a processor, I/O devices, volatile storage, and non-volatile storage. Certain ones of the computers are designated as "servers." A server provides services for one or more other computers which are labelled "clients." A server usually provides non-volatile (e.g. hard disk) storage that can be shared by a number of computers. Servers may also provided shared processing resources and shared access to expensive peripherals, such as high speed printers or scanners.

The sharing of data resident on a server has certain advantages for departments or workgroups with common data processing requirements. Distribution of data over a network, however, can create problems if the network or server experiences an outage. In addition, access to data over a wide area network may be costly and may have increased access times.

One approach to increasing the availability and reliability of distributed systems is to replicate data on more than one server. Thus, a particular shared data file may be replicated or copied to one or more other servers. As a result, a client may recover from failure of a server or network segment by accessing a different replica.

Replication policy can be either "optimistic" or "pessimistic." A pessimistic replication policy requires that at most one copy of the data be writable or updatable. This ensures data consistency because only one copy of the data can be changed and that copy is always assumed to be correct. Other replicas under the pessimistic policy are designated "read-only."

The pessimistic policy ensures data integrity but may result in limited availability of the updatable replica to any one of the clients. An optimistic replication policy, in contrast, allows multiple replicas to be concurrently updatable. Conflicting updates are detected and resolved after they occur. An optimistic replication policy provides higher write availability to client systems. Write sharing between users, i.e. multiple users updating multiple replicas of the same data, is assumed to be infrequent and, consequently, the impact of potential conflicts is minimized.

An optimistic replication policy, however, can lead to inconsistencies in data between replicas on different servers due to server or network failure. A technical problem exists to manage replica updates to minimize inconsistencies and to detect and resolve any inconsistencies in a timely manner.

Existing distributed file systems have been unable to provide a satisfactory solution to this problem. The Andrew File System (AFS) from Transarc Corp. and the Distributed File System (DFS) for the Distributed Computing Environment (DCE) from the Open Software Foundation (OSF) each implement replicated data with a pessimistic replication policy. AFS and DFS allow at most one updatable replica, thereby avoiding the data conflict problem, but sacrificing availability.

The CODA distributed file system, a research project developed at Carnegie Mellon University, implements an optimistic replication policy (see M. Satyanarayanan et al, "CODA: A Highly Available File System for a Distributed Workstation Environment", *IEEE Transactions on Computers*, Vol. 39, No. 4, April 1990.) A client system data request initiates replica update for the data. This update policy has the disadvantage of being controlled by the client, which is assumed to be untrustworthy. It is also not timely because no conflict detection occurs unless a client requests particular data. The CODA approach may also prove to be costly in cases where the communications cost for client-to-server connections is high.

Lotus Notes allows multiple read/write replicas of its special database. Replicas are periodically reconciled, usually no more than once or twice a day. Detection of a conflict between replicas causes the creation of separate versions with no attempt to automatically resolve the conflicts. This results in a significant manual management burden whenever a conflict occurs.

In a paper by Tait et al [see "Server Interface and Replica Management Algorithm for Mobile File System Clients", Computer Science Department, Columbia University], the problem of maintaining replicas in a distributed file system is investigated. The authors argue that in an environment with mobile file system clients a lazy server-based update operation should be used for replica management, and present a solution for this lazy server-based update.

Thus, the technical problem remains of creating an optimistic replication system that permits multiple updatable replicas but identifies and resolves conflicts in a timely and efficient manner.

SUMMARY OF THE INVENTION

The present invention is directed to solving the problem of efficiently maintaining replicated data coherency or consistency in a data processing system using optimistic replication. The present invention provides a system and method for causing the system servers to coordinate among themselves to detect replica inconsistencies and to initiate an update protocol to detect stale or conflicting replicas without waiting for a client request for data.

The present invention is directed to a system for maintaining coherency of data in a data processing system having a plurality of processors interconnected by a communications medium and a plurality of storage devices; each of the storage devices is controlled by at least one of the processors; and the data is replicated on two or more of the plurality of storage devices. The system comprises means for detecting an event requiring update of the replicated data and means for coordinating update of the data, the means for coordinating causing each data replica to become a duplicate of all other replicas.

It is therefore an object of the present invention to provide a replicated data management system with an optimistic replication policy and server controlled conflict resolution.

It is another object of the invention to provide a method for selecting one and only one server to coordinate updates in a network where one or more servers may have failed, and more than one server requires update by the update process.

It is still another object of the invention to implement an update policy that efficiently maintains data consistency.

It is still another object of the invention to implement an update process that resolves most conflicts without manual intervention.

It is yet another object of the present invention to provide a data replication policy that is independent of the server operating system, the network protocol, and the physical file system organization.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
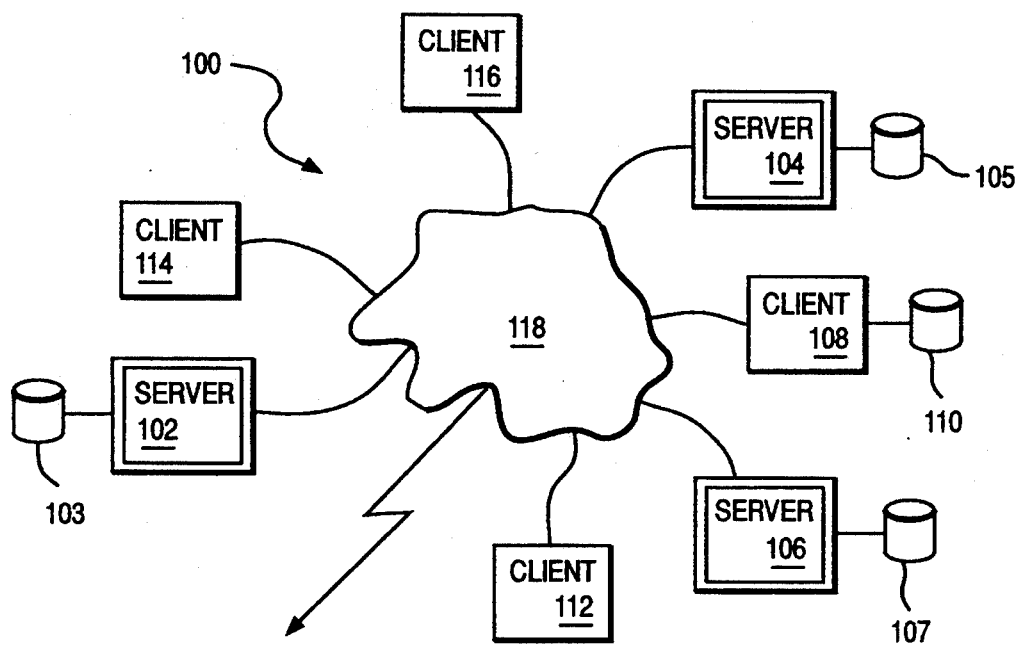
FIG. 1 is a block diagram illustrating a data processing system according to the present invention.

A data processing system according to the present invention is shown in FIG. 1. The overall clustered or distributed system 100 comprises a number of clients and servers interconnected by a network 118. Network 118 may be a local area network (LAN) serving a small business, corporate department or similar entity, or it may include wide area network components interconnecting geographically dispersed sites. Network 118 may also be a private network, e.g. a high speed fiber optic connection or a switch connecting a cluster of machines. The present invention is applicable in all these cases.

Clustered or distributed system 100 includes servers 102, 104, and 106, each of which has non-volatile storage 103, 105, and 107. The non-volatile storage may be magnetic hard disks, optical disks or similar technology. Each of the servers may have any number of each of these types of storage devices. Server systems typically contain large amounts of non-volatile storage having capacities exceeding one gigabyte.

Client workstations 108 112 114 116 are connected to the network and are able to use the services of one or more of servers 102 104 106. A client may have its own non-volatile storage, (e.g. 110) or may rely totally on a server for non-volatile storage.

The configuration of system 100, including the number and configuration of clients and servers, is provided only as an example and is not intended to limit the scope of the invention in any way.

Figure 2:
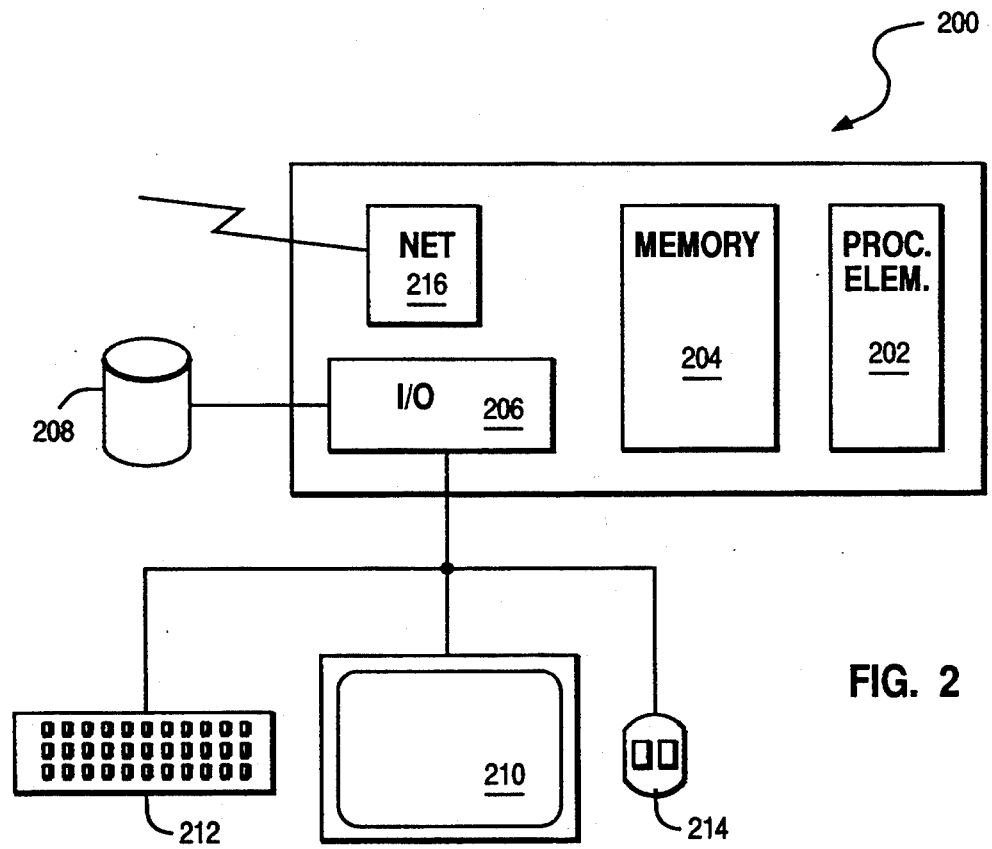
FIG. 2 is a block diagram of a typical server component of the data processing system according to the present invention.

The present invention is implemented within the servers on the network. An example of a server as used by the present invention is shown in FIG. 2 generally at 200. A server can be any computer system such as an IBM PS/2 Model 95 or an IBM RISC System/6000 (IBM, PS/2 and RISC System/6000 are trademarks of the IBM Corporation.) Server 200 has one or more processors or CPUs making up a processor element 202. Processor element 202 has access to volatile memory 204. The processor also controls Input/Output unit 206, which controls access to non-volatile storage, such as hard disk 208, and to input/output devices such as display 210, keyboard 212, and pointing device 214. Other I/O devices could be attached to the input/output unit such as a diskette drive, a CD-ROM drive and other multimedia devices. Network communications is handled by network controller 216. Network controller 216 performs the services necessary to control access to the network and other servers on the network. The physical network can be a token ring, Ethernet or other network. The network protocol can be TCP/IP, Netbios, Netware, or other protocol allowing access to resources and transmission of messages over a network.

Implementation of the present invention is not dependent on client or server operating system, client/server protocol, network protocol or physical file system. The replicated data need not be managed by a formal database management system (DBM). Thus, the present invention may be implemented in a heterogeneous environment where server operating systems vary, being a mixture of AIX, OS/2 and other operating systems.

The present invention includes a computer system containing stored instructions for causing the computer processor to perform a novel process. These instructions can be stored in non-volatile storage such as disk drive 208, or can be stored in a removable medium. The instructions cause the server to become configured in the manner necessary to implement the process of the present invention.

Figure 3:
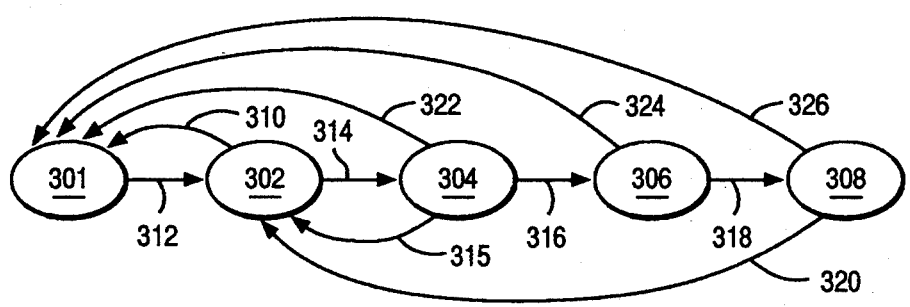
FIG. 3 is a state diagram depicting the server states of the replication system.

FIG. 3 will be used to describe the replica reconciliation process on a server. Each server in the network is in one of five states at any point in time. The five states and the transitions between them are shown in FIG. 3. The server is generally in an "idle or running" state 302. "Idle" refers to the fact that the server is not performing an update function or participating in an election. Failure of the server due to hardware or software failure causes the server to move into the "down" or failure state 301. In the "down" state the server is unable to service client requests and is unable to participate in any election or replication update process. Once the system is restored to "idle or running" state 302 the server moves to the electing state 304. The server may also move to the electing state when an "update event" is detected. The electing state 304 results in the selection of an update coordinator server and leads to "reorganizing" step 306 along path 316. If no other processor participates in the electing, e.g. if they are already in a reorganizing or updating state, then the server returns to "idle or running" state 302 via path 315. In reorganizing state 306 the coordinating server collects and merges the modification logs from the participating servers and sends the merged log back to the participating servers. Finally, each of the servers moves to "updating" state 308 in which the update is performed. Upon completion of its update, the server returns to the "idle or running" state 302. The server may go to a "down" state 301 from any one of the other states.

The preferred embodiment optimistically replicates a fileset or volume at multiple servers. A fileset can be a subtree of a file system or an information directory. The set of servers which store a replica of the fileset is called the fileset storage group (FSG). In a system with multiple servers, each fileset storage group may include different servers and each server may have a replica of any number of filesets. Each replica can be designated as read-write (i.e. updatable) or as read-only.

All operations that cause a change to the data of a read-write replica are entered in a modify log maintained in non-volatile (persistent) storage. The logged operations are known as mutating operations and include operations such as creating a directory, renaming a file, and removing a directory. A separate modify log is maintained for each fileset replica at a server. Mutating operations are routinely transmitted through the network to other servers in the fileset storage group to allow them to make the same modifications and maintain data consistency between the replicas. Network failure or remote server failure may result in the failure to execute a mutating operation at a particular remote server. This failure leads to inconsistent data.

Figure 6:
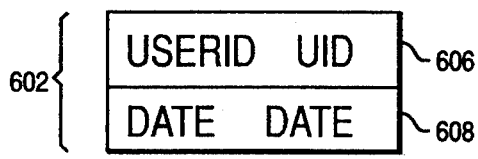
FIGS. 6 and 7 are diagrams illustrating the layout of a modification log according to the present invention.
Figure 6:
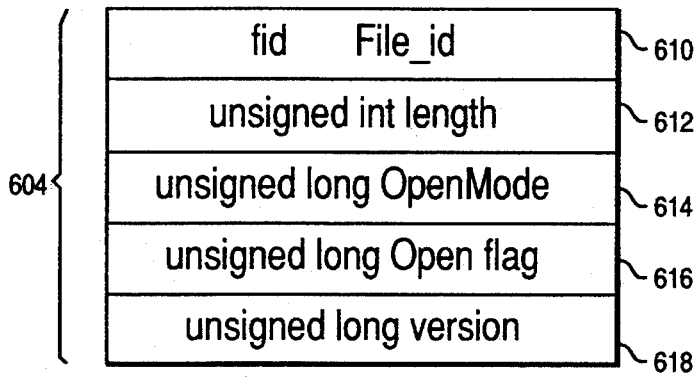
Figure 7:
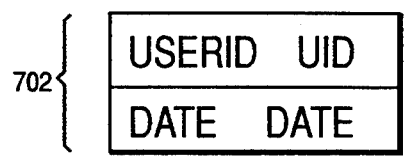
Figure 7:
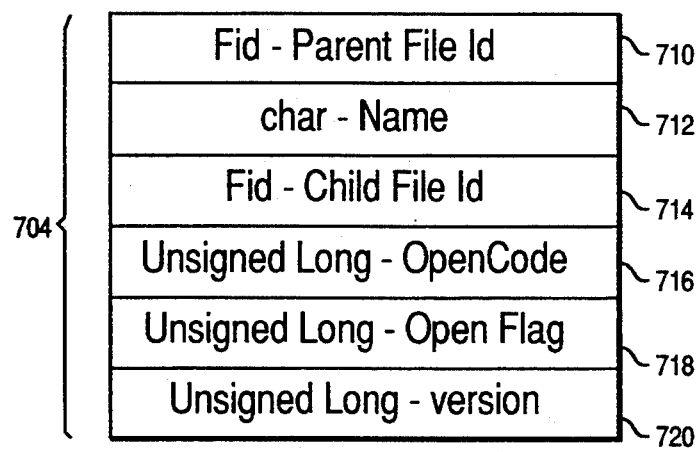

A modification log entry, as illustrated in FIG. 6, is the basis for updating the fileset replicas to maintain data coherency. Thus, the log entry must contain sufficient information to accomplish the update. The log entry typically contains an operation independent portion and an operation dependent portion. Operation independent portion 602 contains, in the preferred embodiment, the userid of the update 606 and the date of the transaction 608. Operation dependent portion 604 (including portions 610, 612, 614, 616, 618) varies by operation. FIG. 6 shows a store-log entry and FIG. 7 a create entry. Portion 702 corresponds to portion 602. The create log entry consists of the following: the file id 710 of the directory in which the file was created, name of the file being created 712, file id of the file being created, 714; the open mode 716 of the file; open flags 718, and file version 720.

Replica coherency first requires identification of the servers with replicas that are missing updates and then requires transmission of the necessary updates to that server for application to the out of data replica. The preferred embodiment of the present invention implements an aggressive update propagation protocol for determining when replica updates must occur. The protocol is termed aggressive because it is designed to cause replica update as soon as possible after failure without waiting for a request for data from a client system. Prior art systems use a lazy policy in which the update process is not triggered unless a client request detects stale data. The update propagation protocol triggers updates in two ways. The first is periodic updates at scheduled intervals or scheduled times. The second is the detection of system events that require replica update. Clients do not participate in the update process because a client machine is not trusted and may have limited processing capability.

Scheduled updates can be defined at a particular frequency or time. Updates can also be event-triggered. For example, a heartbeat mechanism can be used to detect network or server failure and recovery from such failure. If a server does not receive a heartbeat pulse from another server in the fileset storage group within a specified interval of time, it assumes that a network or server failure has occurred. Recovery from this failure is then used to trigger an update process. The preferred embodiment, however, does not implement a heartbeat mechanism because of the network resources such a mechanism would consume.

System events that cause update propagation include recovery from a server crash, recovery from a network partitioning due to partial network failure, and a request for data by a client. Recovery from a server failure or network failure can be detected using a heartbeat mechanism. A request for data by a client causes the server to probe the other servers for the most current copy. If the server detects that one or more of the replicas are stale, the requesting server will trigger an update. Note in the latter case the request for data by a client may trigger an update propagation, but the update will not be controlled by the client as was the case in prior art systems.

Figure 4:
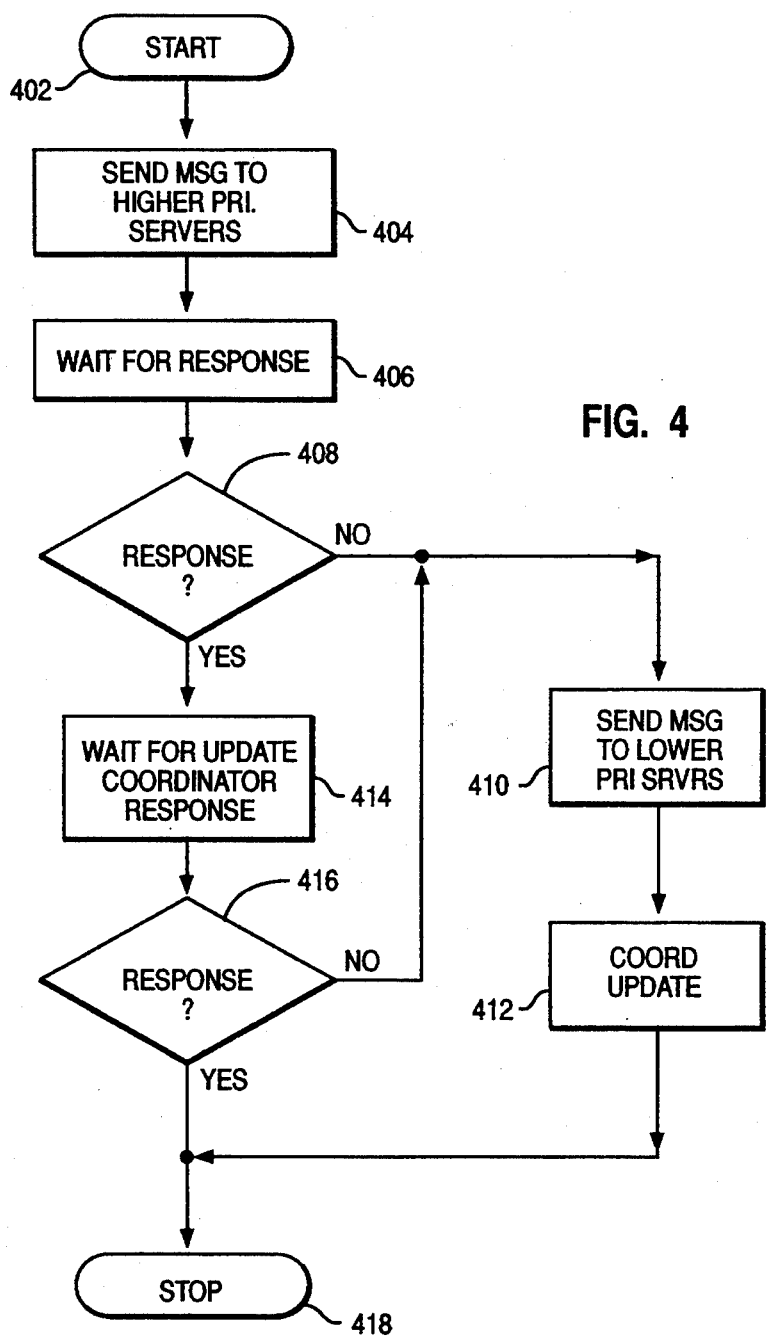
FIG. 4 is a flow diagram depicting the update coordinator election process.

An update event causes the server to move to the "electing" state 304 which performs the election process. The election process performed in the electing state is shown in greater detail in FIG. 4. The election process implements a modified "bully" algorithm, in which the server with the highest priority is elected. Each server is assigned a unique priority in the network. The preferred embodiment assigns one as the highest priority, though other priority schemes could be employed. A server is eligible to participate in the election process as long as it is not already participating in an update process for the fileset under consideration. The modification to the algorithm enable it to handle a large number of server failure conditions including server sleep and server hardware and software failure.

The process begins at step 402 and proceeds immediately to 404. Each server in the fileset storage group broadcasts a message to all other higher priority servers in the fileset storage group every T seconds. If a server, B, does not receive a response from any of the higher priority servers within a specified time period 406, then it assumes that all higher priority servers have failed and that it can be the coordinator. Server B then sends a message 410 to all servers having a lower priority indicating that it is the coordinator for updates to a specific fileset and then coordinates the update process 412.

If one or more servers with a higher priority than B respond that B cannot be the coordinator, then B waits for a specified time 414 for a message from a higher priority server that it has become the update coordinator. If no message is received 416, then server B assumes all higher priority processors have failed and it becomes coordinator, sends a coordinator message to lower priority servers 410, and coordinates the update process 412.

The preferred embodiment of the present invention uses a modified "bully" algorithm to handle failure conditions. The modified algorithm ensures that each server will have only one coordinator, but does not guarantee that only one coordinator will be elected. The modified algorithm recognizes the current state of each server in the fileset storage group (as shown in FIG. 3.) The state can be:

down: server will not respond to election announcements or locking requests for a fileset update protocol;

idle: server is idle and between fileset updates;

electing: server is currently participating in an election, i.e. it is waiting to hear from servers with higher priority whether or not it can become coordinator;

reorganizing: server is currently involved in a lock and fetch operation, i.e. the fileset is write locked and the fileset's update log is extracted from persistent storage;

updating: server is participating in an update.

A server that is reorganizing, updating or down does not participate in an election.

Figure 5:
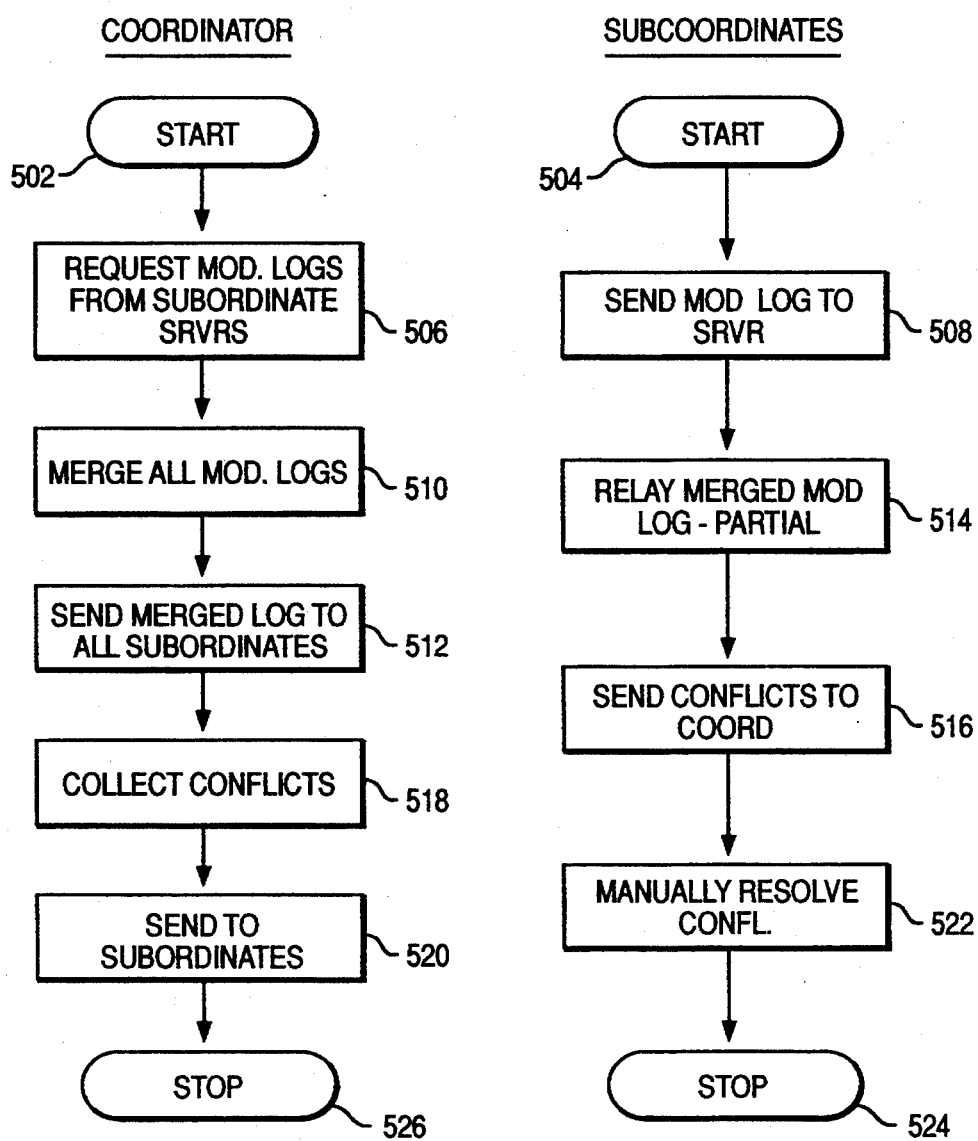
FIG. 5 is a flow diagram depicting the update process at the master coordinator server and the subordinate servers.

The election of a coordinator is followed by the update process. The remaining update phases are shown in FIG. 5. The processes for the coordinator and subordinates are both shown to help describe the interaction. The process starts 502 504 with the election of a coordinator server. The coordinator server first locks its own fileset and sends a request to all subordinates to lock that fileset and to send the current fileset version vector to the coordinator.

Subordinates that successfully lock the fileset become subordinates for the rest of the update protocol. If the coordinator receives no acknowledgement from any subordinate that it is able to lock the fileset, or if all subordinates respond that the fileset is already locked, then the coordinator state for this server ends and a new election is initiated after a specified delay.

A fileset version vector is maintained by each server for each fileset replica [see Parker et al, "Detection of Mutual Inconsistency in Distributed Systems", IEEE Transactions on Software Engineering, May 1983]. Each modification to a replica on a server is tagged with a unique store-id (store identification label) by the client performing the operation. The server maintains an approximation of the update history for a replica consisting of the latest store-id and length of update history, i.e. the number of updates to this replica. The server also maintains an estimate of the length of the update history of every other replica in the fileset storage group. The vector of update lengths is the fileset version vector.

Two replica states can be compared using their store-ids and version vectors. The result indicates whether the replicas are identical, inconsistent due to concurrent updates to both replicas, or unequal (one replica updated but not the other.)

The coordinator compares replica states. If all replicas are identical, no further action is required and the update process ends.

Next the coordinator requests the modification log from each subordinate 506 for the fileset to be updated. Each subordinate sends its modification log to the coordinator 508. A subordinate who fails to respond within a specified time is dropped from the update.

The coordinator merges the logs 510 from all subordinates and sends 512 the merged log to all subordinates. Each subordinate performs the updates 514 that were missing from its replica. In the preferred embodiment, the missing updates are executed within a single transaction to guarantee atomicity. Application of the update is noted in the modification log. Once all updates are applied, the changes are committed and the replay ends.

If the subordinate cannot replay an update due to conflict it is added to a conflict list that is sent 516 to the coordinator after all updates are attempted. Concurrent updates made to a file or directory in multiple partitions which cannot be merged without violating semantic constraints are called conflicting. Concurrent updates of a directory which do not refer to the same object can be merged automatically as they are not conflicting. Conflict resolution specific to a particular application such as bulletin boards or e-mail can also be provided to allow automatic conflict resolution.

Once the updates are complete, the coordinator informs the subordinates that the fileset may be unlocked. If the update phase completes successfully, the coordinator sends a new store-id to mark all replicas as equal. If the update replay phase was not successfully completed due to conflicts, the coordinator determines 518 which files are in conflict and marks them as such. A conflict list is sent to each subordinate 520. A client may access the files on the conflict list using a repair utility to manually repair the conflicting files 522.

The preferred embodiment uses a heartbeat mechanism to detect coordinator or subordinate failure during the update process. The coordinator periodically, e.g. every h seconds, sends a heart-beat pulse to each subordinate. If a subordinate does not receive a pulse for 2 h seconds, it concludes that the coordinator has failed. The coordinator similarly detects failure of a subordinate if a heart-beat signal is not received from the subordinate for 2 h seconds.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A system for maintaining coherency of replicated data in a distributed data processing system having a plurality of processors interconnected by a communications medium and a plurality of storage devices, each of said storage devices controlled by at least one of said plurality of processors, said replicated data being replicated on two or more of said plurality of storage devices, said system comprising:

means for detecting an event occurring in said data processing system;

means for initiating an update of said replicated data in response to said detected event;

means for selecting one of said plurality of processors to coordinate said update of said replicated data;

said selected one of said plurality of processors to coordinate said update of said replicated data including means for updating said replicated data, said means for updating causing each copy of said replicated data to become a duplicate of all other copies of said replicated data, said updating means including: means for requesting modification logs from said plurality of processors; means for receiving all requested modification logs; means for merging all received modification logs; and means for sending said merged modification logs to said plurality of processors.

2. The system of claim 1, wherein certain of said plurality of processors are designated server processors and wherein said means for selecting selects a coordinating processor from said server processors.

3. The system of claim 1, wherein said means for selecting includes:

means for establishing a priority for each of said plurality of processors;

means for querying each higher priority processor to determine which of said each higher priority processor will coordinate said update of said replicated data;

means for detecting responses to said query; and means for signalling assumption of coordination role to processors of lesser priority upon selection of one of said plurality of processors to coordinate said update of said replicated data.

4. A method of aggressively maintaining data coherency between two or more replicas of data distributed between two or more servers, said method comprising the steps of:
  logging changes to one of said two or more data replicas;
  detecting an event occurring in one or more of said two or more servers;
  initiating reconciliation of said two or more replicas;
  selecting one of said two or more servers to coordinate said reconciliation;
  determining changes needed to each of said two or more replicas based on said logged changes to said one or said two or more data replicas;
  making said determined changes to said each of said two or more replicas and detecting any data conflicts; and
  recording data conflicts associated with said determined changes made to said each of said two or more replicas for later resolution.

5. The method of claim 4, wherein said event includes a scheduled update, return to service of a server, and network link reconnection.

6. The method of claim 4, wherein said selected one of said two or more servers is controlled by an operating system that differs from an operating system of at least one other of said two or more servers.

7. The method of claim 4, wherein each of said two or more data replicas is stored on a physical file system and said selected one of said two or more servers maintains a physical file system that differs from a physical file system of at least one other of said two or more servers.

8. The method of claim 4, wherein said step of selecting one of said two or more servers to coordinate said reconciliation comprises the steps of:
  assigning a priority to each of said two or more servers;
  sending by each of said two or more servers a message to each server of a higher priority querying whether said higher priority server will become said selected one of said two or more servers to coordinate said reconciliation;
  detecting higher priority server responses to said querying messages sent to each of said two or more of said servers; and
  if no response from a higher priority server is detected by a particular one of said two or more of said servers, sending a message by said particular one of said two or more of said servers to each server of a lower priority signalling assumption of coordinator server role by said particular one of said two or more of said servers.

9. The method of claim 8, wherein one and only one coordinator server is selected for each system partition.

10. The method of claim 9, wherein at least two of said two or more of said servers are controlled by different operating systems.

11. The method of claim 10, further comprising:
  means for detecting coordinator server failure and causing said step of selecting one of said two or more servers to be repeated.

* * * * *